Patented June 7, 1949

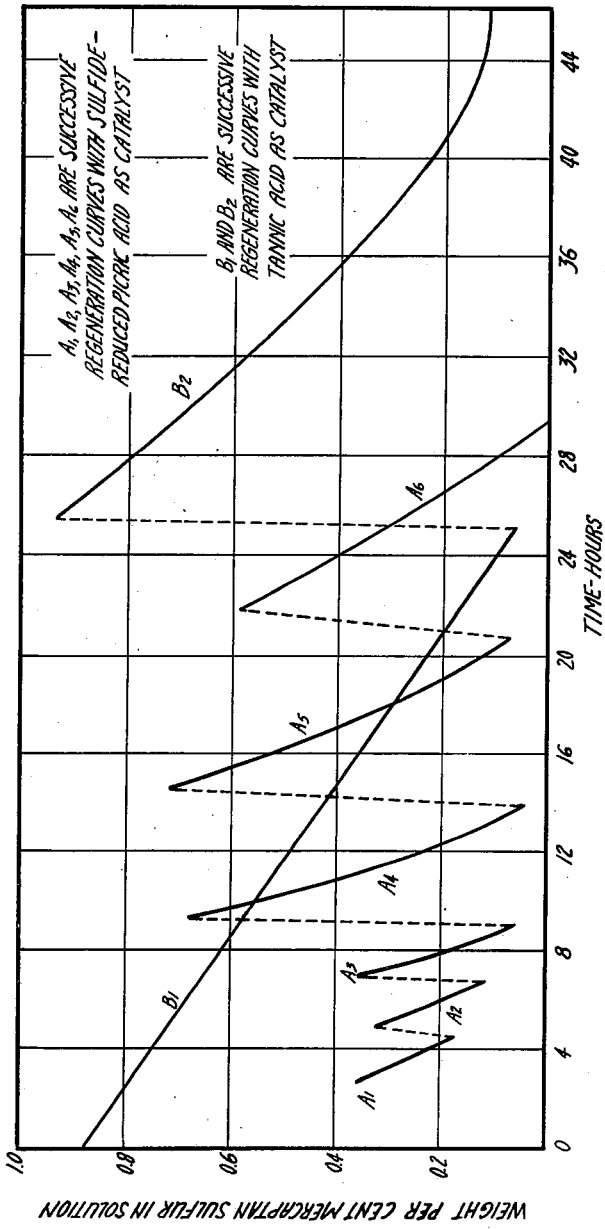

2,472,473

UNITED STATES PATENT OFFICE 2,472,473

CONVERSION OF HYDROSULFIDES TO NEUTRAL SULFUR SUBSTANCES

Lloyd C. Fetterly, Long Beach, Calif., assignor to Shell Development Company, San Francisco, Calif., a corporation of Delaware Application December 16, 1946, Serial No. 716,638

15 Claims. (Cl. 23—224)

This invention relates to the oxidation of sulfhydryls or hydrosulfides, i. e. $H_2S$ and mercaptans, including both aliphatic mercaptans and thiophenols, to neutral sulfur substances, i. e. free sulfur and organic disulfides. More particularly, it deals with employing certain amino-hydroxy-nitrobenzenes as catalysts for this oxidation.

The oxidation of hydrosulfides has particular application in the regeneration of alkaline solutions employed for treating sour hydrocarbons whereby hydrosulfides are extracted by the alkaline solution and then are oxidized (such as by air blowing) to form neutral sulfur substances. These neutral substances are then removed so that the alkaline solution may be used again to extract more hydrosulfides from more sour hydrocarbon distillates. Still another application of the oxidation of hydrosulfides is in the recovery of the sulfur content of hydrogen sulfide, or of sulfides which are readily convertible into hydrogen sulfide, e. g., calcium sulfide as may be produced in the LeBlanc process for the manufacture of sodium carbonate and which calcium sulfide readily reacts with water to liberate hydrogen sulfide.

It is a purpose of this invention to simply, efficiently, and economically oxidize hydrosulfides to neutral sulfur substances. Another purpose is to simply, efficiently and economically regenerate by oxidation alkaline solutions employed in treating sour hydrocarbon distillates and other hydrocarbon fluids which contain hydrosulfides. Still another purpose is to speed up such oxidation reactions with a small amount of an active and stable oxidation catalyst. Further incidental purposes are: to increase the lead susceptibility of gasoline treated with alkaline solutions regenerated by the process of this invention; to lower the mercaptan sulfur content of gasolines so treated; to increase the solubility of mercaptans in such alkaline treating solutions; etc.

Broadly stated, the process of this invention comprises effecting the oxidation by suitable oxidizing agents of hydrosulfides to convert them to neutral sulfur substances in the presence of a small amount of a nitrobenzene oxidation catalyst containing attached to the benzene nucleus three polar groups selected from the groups consisting of amino and hydroxy groups, such as 2,6-diamino-4-nitrophenol and 2,6-dihydroxy-3-nitroaniline.

A specific embodiment of the process as applied to the regeneration of spent alkaline solutions produced in the removal of hydrogen sulfide and/or mercaptans from hydrocarbon mixtures may comprise the following steps: (1) extracting hydrogen sulfide and/or mercaptans from the hydrocarbon mixtures containing them with an aqueous alkaline solution, which may or may not contain a solutizer (solubility promoter) for said hydrogen sulfide and mercaptans; (2) separating the resulting aqueous alkaline solution phase containing dissolved hydrosulfides; (3) treating as by contacting the separated aqueous phase with a suitable oxidizing agent for said hydrosulfides in the presence of one of said above-mentioned nitrobenzene oxidation catalysts to convert said hydrosulfides and to precipitate them as neutral sulfur substances, such as free sulfur and/or organic disulfides; (4) removing these precipitated neutral sulfur substances; and (5) recycling the resulting regenerated aqueous alkaline solution for extracting more hydrosulfides from more hydrocarbon mixture containing hydrosulfides.

Hydrosulfides may be derived from any natural or synthetic source. Thus, petroleum or coal tar fluids, such as natural or coke oven gases, natural gasolines, gasolines, kerosene, etc., both straight run and cracked, usually contain hydrogen sulfide and/or mercaptans. Furthermore, hydrogen sulfide may be produced by hydrolysis of such sulfides as calcium sulfide which may be produced as an undesirable waste product of a desirable reaction or sequence of reactions.

Generally the oxidation of hydrosulfides is carried out in an alkaline solution and therefore at least a part of the hydrosulfides is present in the form of a metal sulfide or a mercaptide.

Various alkaline treating solutions may be employed. If hydrogen sulfide is to be oxidized, the alkaline treating solution may comprise alkali or alkali earth metal hydroxides, phosphates, carbonates, phenolates, borates, arsenates, organic amines such as alkanol amines, alkylene diamines, piperidine, piperazine, diazine, pyridines, quinolines, picolines, etc. If mercaptans are to be oxidized, the alkaline treating solution may comprise aqueous alkali metal hydroxide solutions which may or may not contain solutizers for mercaptans.

Solutizers promote the solubility of the hydrosulfides in aqueous alkaline solutions. Some suitable solutizers are lower alkyl mono and poly hydroxides, lower aliphatic polyamines, alkanol amines, hydroxy or amino ethers, fatty acids of 2 to 6 carbon atoms, naphthene carboxylic acid of 5 to 11 carbon atoms, phenols containing up to 15 carbon atoms, etc. The preferred solutizers are phenols and fatty acids containing from 3 to 5 carbon atoms.

Oxidizing agents suitable for converting hydrosulfides to neutral sulfur substances include peroxides, perborates, permanganates, manganese dioxide, chromates, hypochlorites, oxygen, air (preferably free of carbon dioxide), etc. Air blowing at temperatures between about 60° F. and 200° F. and preferably not above about 150° F., has been found to be a satisfactory method for oxidizing hydrosulfides in the presence of the catalysts in accordance with this invention. The pressure is usually atmospheric, but higher or lower pressures may also be employed, if desired.

Neutral sulfur substances formed by oxidation include free sulfur (oxidized from hydrogen sulfide) and organic disulfides (oxidized from mercaptans and mercaptides) forming solid or liquid precipitates in aqueous alkaline solutions. These precipitates are easily removed by decantation, settling or filtering. The rate of settling of the sulfur materials in aqueous spent alkaline solutions may be increased by dilution. In certain alkaline solutions (such as solutizer solutions) having a high content of organic constituents, organic disulfides may be fairly soluble and may have to be extracted with suitable solvents, such as hydrocarbon liquids.

The particular oxidation catalysts of this invention are nitrobenzenes containing, preferably on the same benzene ring, in addition to the nitro radical, at least three other polar radicals, preferably in ortho and/or para relationships to each other, selected from the group consisting of amino and hydroxy radicals. Other radicals may also be substituted on the benzene ring, such as alkyl, alicyclic, aryl (condensed or otherwise), halogen, carboxyl, and further hydroxy, amino and/or nitro radicals. By amino radical is meant to include those amino radicals in which one hydrogen atom of the amino radical has been substituted with an alkyl, aryl, or acyl radical.

These catalysts, in general, become more resistant toward being themselves oxidized as more vacant positions on their benzene rings are filled with stabilizing groups. The addition of further hydroxy and amino radicals increases the activity of the catalyst but frequently reduces its stability. On the other hand, the addition of carboxyl, nitro, sulfonyl, phosphonyl, etc., radicals increases the stability of the catalyst. Polar radicals in general increase the solubility of the catalyst in alkaline solutions, while hydrocarbon radicals usually decrease their solubility. Preferably, the catalyst should be more soluble in aqueous alkaline solutions than in hydrocarbons.

Some suitable catalysts are 2,6-diamino-4-nitrophenol, 2,4-diamino-6-nitrophenol, 2,6-dihydroxy-3-nitroaniline, 2,4-dihydroxy-3-nitroaniline, 2,6-dihydroxy-3,5-dinitroaniline, 2,4-dihydroxy-3,5-dinitroaniline, 2,3-diamino-6-nitrophenol, 2,3-diamino-4,6-dinitrophenol, 2,6-diamino-4-nitro-metacresol, etc. It will be understood that mixtures of catalysts in accordance with the present invention may be utilized. Also, a catalyst mixture comprising a substantial proportion of the amino-hydroxy-nitrobenzenes containing three polar groups attached to the benzene nucleus selected from amino and hydroxy groups, in accordance with this invention, and containing also other amino- and/or hydroxy-nuclear substituted nitrobenzenes such as picramic acid may be utilized in the application of the invention. A preferred catalyst of the present invention is a diamino-nitrophenol, e. g. the 2,6-diamino-4-nitrophenol, which, since it may be produced by reduction of picric acid to picramic acid and then to said diamino-nitrophenol, may be named a picridiamic acid, with the corresponding salts named picridiamates.

The amount of catalyst employed may vary between about .01% and 5% by weight (and preferably between .05% and 1% by weight) of the solution to be oxidized containing the hydrosulfides. Within the above limits greater amounts of catalyst produce faster oxidation of the hydrosulfides for any given solution and given set of operating conditions.

In the usual catalytic oxidation processes used in the art for the regeneration of the spent alkaline solutions, the oxidation of the hydrosulfides is controlled so that between about .1% and 1% by weight of hydrosulfides, usually as low molecular weight mercaptans, will remain unoxidized in order to insure against the oxidation of the catalyst. For instance, in the case of the tannin catalyst process, in order to prevent excessive catalyst consumption by destructive oxidation, a relatively high residual mercaptan sulfur content, usually above about 0.2% wt., is left unoxidized in the regenerated alkaline solution; this relatively high residual mercaptan sulfur content in the lean solution raises the level to which the sulfur content of gasoline may be reduced by contacting it with this lean solution, and this level is usually above that required to produce a doctor sweet gasoline.

The stability of the catalyst of the present invention against destructive oxidation is sufficient to permit spent solution regeneration to a mercaptan sulfur content of less than 0.05% by weight, which makes it possible to produce doctor sweet gasoline from a normal sour gasoline without the assistance of supplementary operations.

Residual mercaptan sulfur in the regenerated treating solution controls its so-called re-entry value, that is the amount of mercaptan that is introduced into a hydrocarbon distillate by contacting it with the regenerated treating solution. If the re-entry value is too high the hydrocarbon distillate cannot be sweetened by extraction with regenerated solution. Hence, it is important that the residual mercaptan sulfur content and its consequent re-entry value be as low as possible. A particular advantage of the present invention is that it makes it possible to regenerate the treating solution to a very low re-entry value.

The preferred oxidation catalyst of this invention, namely picridiamic acid, is readily available on the market. However, it may be prepared very easily and satisfactorily simply by treating picric acid or picramic acid with a soluble sulfide such as potassium sulfide at a temperature in the order of from about 130° F. to about 212° F., a temperature of about 130-150° F. having been found to be quite satisfactory. It is not necessary to reduce all of the picric acid or the picramic acid to the diamino stage, since reduction to a product which corresponds to a ratio of about 1.5 nitro groups per benzene nucleus, that is a product containing the diamino- and the monoamino-substances in a molar ratio of about one, yields a catalyst of high activity. Thus, it is only necessary to treat a solution of picric acid at about 130° F. for a short period of time, e. g. about ten minutes, with sufficient alkali sulfide to convert an average of 1.5 of the nitro groups per molecule to amino groups. In general, the reduction to an amino group of only substantially more than one of the nitro groups of picric acid yields a product of good catalytic activity. The resulting product, which would normally be an aqueous solution, may then be added directly to the alkaline treating solution. Or, the picric acid or picramic acid may be added first to a caustic alkali solution which is to be used subsequently as a treating solution, and the above-indicated reduction effected.

The utility of the present invention will be illustrated in the following examples.

EXAMPLE I

A solutizer solution of the following composition,

30% volume of 2000 grade cresylic acid (mixture of alkyl phenols)
70% volume of 36.5% weight sodium hydroxide was used in tests to compare the catalyst stability of sulfide-reduced picric acid in accordance with the foregoing description of the preparation of the catalyst of this invention and tannic acid, respectively. The sulfide reduced picric acid and tannic acid were added to separate portions of the solution in a 0.05% by weight concentration. To the separate solutions were added mixtures of lower molecular weight mercaptans having from one to four carbon atoms per molecule to give weight concentrations as indicated on the curves of the accompanying drawing. The solutions were then regenerated separately by continuous circulation over a packed column at 130° F. while blowing with air to oxidize the mercaptans to disulfides. When the concentration of the mercaptan sulfur had fallen to below 0.05% by weight, which was essentially zero when calculated on the basis of oxidation time, an additional amount of mercaptan was added to the regenerated solution to raise the mercaptan sulfur value to that indicated on the curves, and the thus spent alkaline solution was again regenerated by treatment with air-oxygen at 130° F.

As can be seen from the curves in the drawing, the rate of regeneration of the solution containing the sulfide reduced picric acid catalyst of this invention had not been decreased materially after even six regeneration operations although in the regenerations thereof the mercaptan sulfur content of the alkaline solution had been reduced to a value of substantially zero, which is the critical zone of the regeneration since it is when the mercaptan sulfur concentration is reduced to a very low value that the catalyst itself is subjected to oxidative deterioration. On the other hand, the rate of regeneration of the solution containing the tannic acid catalyst was materially reduced even in a second regeneration step, within the lower range of mercaptan sulfur concentration which is the range wherein it is most desired to have high catalyst activity. In these series of tests, the sulfide reduced picric acid was not completely spent at the end of the sixth regeneration but was still effective for the process; however, the tannic acid had decomposed into a tarry residue and was no longer sufficiently active to be effective for the process. During the indicated operations of this example, 70 pounds of mercaptan-sulfur were oxidized per pound of picric acid use; whereas each pound of tannic acid catalyst oxidized only 25 pounds of mercaptan sulfur.

EXAMPLE II

A quantity of the regenerated solutizer solution of Example I containing the sulfide-reduced picric acid catalyst of this invention and containing about 0.05% of mercaptan sulfur was employed to treat several gasoline samples produced by different normal refinery operations. After treating the gasoline sample with the solutizer solution, the gasoline phase was separated from the aqueous solutizer phase and the gasoline phase analyzed for mercaptan sulfur content. The treating ratios and the mercaptan sulfur contents before and after the indicated treatment are shown in Table I.

*Table I*

| Gasoline Stock | Ratio, Solutizer/ Gasoline | Mercaptan Sulfur Content, per cent wt. | |
|---|---|---|---|
| | | Before Treatment | After Treatment |
| 1 | 1/1 | 0.0086 | 0.0001 |
| 2 | 1/1 | .0065 | .0001 |
| 3 | 1/1 | .310 | .0002 |
| 4 | 0.18/1 | .010 | .0001 |

EXAMPLE III

In order to show the relative utility of application of the regenerated alkaline treating solution of the present invention for the removal of mercaptan sulfur from gasoline as compared with a process which utilizes a usual doctor method, a sample of doctor treater feed gasoline containing 0.01% wt. of mercaptan sulfur was treated with a quantity of the regenerated solutizer solution of Example I and the thus treated gasoline was compared with the doctor treated gasoline with respect of F-1 and F-2 octane ratings in differential tests, rating the gasoline samples one against the other in the engines. The results tabulated in Table II show that the solutizer treated gasoline was slightly higher in octane rating than doctor treated gasoline, the difference being greater at high load level.

*Table II*

| | Doctor Treated | Solutizer Treated | Difference |
|---|---|---|---|
| F-1 Octane No., clear | 97.1 | 97.3 | 0.2 |
| F-1 Octane No.+2.0 cc. TEL | 98.7 | 100.5 | 1.8 |
| F-2 Octane No., clear | 81.1 | 81.5 | 0.4 |
| F-2 Octane No.+2.0 cc. TEL | 82.0 | 82.6 | 0.6 |

This application is a continuation-in-part of my copending application, Serial No. 542,256, filed June 26, 1944, now Patent No. 2,426,087, issued August 19, 1947.

I claim as my invention:

1. A process for converting hydrocarbon hydrosulfides to neutral sulfur substances, comprising contacting said hydrocarbon hydrosulfides in an aqueous alkaline solution with an oxygen-containing oxidizing agent for said hydrosulfides in the presence of a small amount of an amino-hydroxy-nitrobenzene oxidation catalyst containing attached to the benzene nucleus three polar groups selected from the class of groups consisting of amino and hydroxy groups.

2. A process for converting hydrogen sulfide to neutral sulfur comprising contacting said hydrogen sulfide in an aqueous alkaline solution with an oxygen-containing oxidizing agent for hydrogen sulfide in the presence of a small amount of an amino-hydroxy-nitrobenzene oxidation catalyst containing attached to the benzene nucleus three polar groups selected from the class of groups consisting of amino and hydroxy groups.

3. A process for converting aliphatic hydrocarbon hydrosulfides to aliphatic hydrocarbon disulfides comprising contacting said aliphatic hydrocarbon hydrosulfides in an aqueous alkaline solution with an oxygen-containing oxidizing agent for said hydrosulfides in the presence of a small amount of an amino-hydroxy-nitrobenzene oxidation catalyst containing attached to the benzene nucleus three polar groups selected from the class of groups consisting of amino and hydroxy groups.

4. A process for converting aliphatic hydrocarbon hydrosulfides to aliphatic hydrocarbon disulfides comprising contacting said aliphatic hydrocarbon hydrosulfides in an aqueous alkaline solution of an alkali metal alkaline compound with an oxygen-containing gas in the presence of from about 0.01% to about 5% by weight based on the weight of said solution of an amino-hydroxy-nitrobenzene oxidation catalyst containing attached to the benzene nucleus three polar groups selected from the class of groups consisting of amino and hydroxy groups.

5. A process for converting hydrocarbon hydrosulfides to neutral sulfur substances comprising contacting said hydrocarbon hydrosulfides in an aqueous alkaline solution with an oxygen-containing gas in the presence of a small amount of an amino-hydroxy-nitrobenzene oxidation catalyst containing attached to the benzene nucleus three polar groups selected from the class of groups consisting of amino and hydroxy groups.

6. A process for converting hydrocarbon hydrosulfides to neutral sulfur substances comprising contacting said hydrocarbon hydrosulfides in an aqueous alkaline solution of an alkali metal alkaline compound with an oxygen-containing oxidizing agent for said hydrosulfides in the presence of a small amount of an amino-hydroxy-nitrobenzene oxidation catalyst containing attached to the benzene nucleus three polar groups selected from the class of groups consisting of amino and hydroxy groups.

7. A process for converting hydrocarbon hydrosulfides to neutral sulfur substances comprising contacting said hydrocarbon hydrosulfides in an aqueous alkaline solution with an oxygen-containing oxidizing agent for said hydrosulfides in the presence of from about 0.01% to about 5% by weight based on the weight of said solution of an amino-hydroxy-nitrobenzene oxidation catalyst containing attached to the benzene nucleus three polar groups selected from the class of groups consisting of amino and hydroxy groups.

8. A process for converting hydrocarbon hydrosulfides to neutral sulfur substances comprising contacting said hydrocarbon hydrosulfides in an aqueous alkaline solution with an oxygen-containing oxidizing agent for said hydrosulfides in the presence of a small amount of a picridiamic acid salt as an oxidation catalyst.

9. A process for converting hydrocarbon hydrosulfides to neutral sulfur substances comprising contacting said hydrocarbon hydrosulfides in an aqueous alkaline solution with an oxygen-containing oxidizing agent for said hydrosulfides in the presence of a small amount of an oxidation catalyst prepared by the reduction of picric acid to a product which corresponds to a reduction of about 1.5 nitro groups of picric acid to amino groups.

10. In a process for regenerating spent aqueous alkaline solutions containing hydrosulfides extracted from sour hydrocarbons, the improvement comprising contacting said spent solution with an oxygen-containing oxidizing agent for said hydrosulfides in the presence of a small amount of an amino-hydroxy-nitrobenzene oxidation catalyst containing attached to the benzene nucleus three polar groups selected from the class of groups consisting of amino and hydroxy groups.

11. In a process for regenerating spent aqueous alkaline solutions containing hydrosulfides extracted from sour hydrocarbons, the improvement comprising contacting said spent solution with an oxygen-containing oxidizing agent for said hydrosulfides in the presence of a small amount of 2,6-diamino-4-nitrophenol as an oxidation catalyst.

12. In a process for regenerating spent aqueous alkaline solutions containing mercaptans extracted from sour hydrocarbons, the improvement comprising contacting said spent solution with an oxygen-containing gas in the presence of from about 0.01% to about 5% by weight based on the weight of said solution of 2,6-diamino-4-nitrophenol as an oxidation catalyst.

13. In a process for regenerating spent aqueous alkaline solutions containing hydrosulfides extracted from sour hydrocarbons, the improvement comprising contacting said spent solution with an oxygen-containing oxidizing agent for said hydrosulfides in the presence of a small amount of an oxidation catalyst prepared by the reduction of picric acid to a product which corresponds to a reduction on the average of substantially more than one nitro group to an amino group for each molecule of said picric acid.

14. In a process for regenerating spent aqueous alkaline solutions containing hydrosulfides extracted from sour hydrocarbons, the improvement comprising contacting said spent solution with an oxygen-containing gas in the presence of a small amount of 2,6-diamino-4-nitrophenol as an oxidation catalyst.

15. In a process for regenerating spent aqueous alkaline solutions containing hydrosulfides extracted from sour hydrocarbons, the improvement comprising contacting said spent solution with an oxygen-containing oxidizing agent for said hydrosulfides in the presence of a small amount of 2,4-diamino-6-nitrophenol as an oxidation catalyst.

LLOYD C. FETTERLY.

REFERENCES CITED

The following references are of record in the file of this patent:

UNITED STATES PATENTS

| Number | Name | Date |
| --- | --- | --- |
| 2,015,038 | Pevere | Sept. 17, 1935 |
| 2,369,771 | Bond | Feb. 20, 1945 |
| 2,413,945 | Bolt | Jan. 7, 1947 |